Patented Mar. 5, 1929.

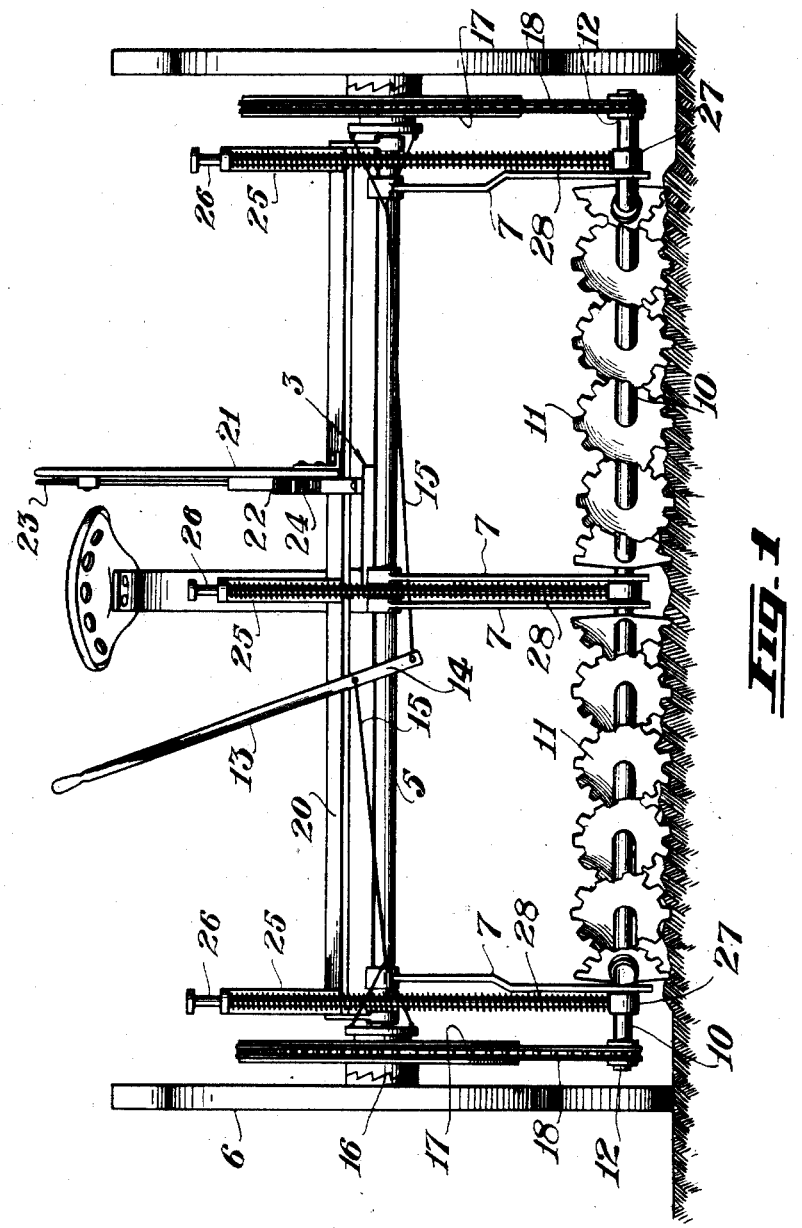

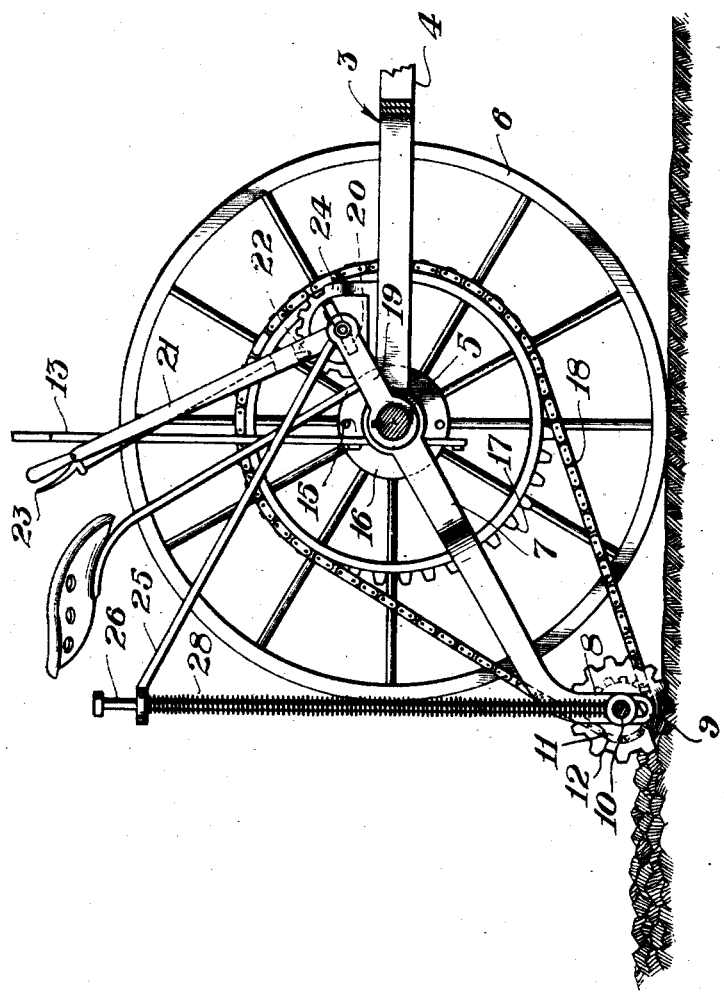

1,704,349

UNITED STATES PATENT OFFICE.

HORACE McGREGOR SPENCER, OF GREAT VILLAGE, NOVA SCOTIA, CANADA.

HARROW.

Application filed May 15, 1926, Serial No. 109,296, and in Canada April 14, 1926.

This invention relates to improvements in a harrow appertaining particularly to a pulverizer or soil working machine designed to break up sod after it has been turned by the plow, cutting the same up finely and more or less leveling the field.

The object is to provide a harrow of this sort wherein a pair of spiral screw cutters or augers that are wound in opposite directions are adapted to be held in contact with the ground and rotated by the drive wheels of the machine, thus thoroughly agitating the soil and destroying weeds and other rancorous growths.

A further object is to provide a device of the character described comprising a sulky frame having rearwardly extending arms by which to carry the rotatable augers and a secondary frame, pivotally carried by this main frame by which the desired pressure is applied to the soil working augers.

A still further object is the provision of such a device, that will break up clods and caked matter upon the surface; destroy undesirable growths; and disintegrate, spread, level and generally thoroughly and adequately pulverize the soil.

A still further object is the provision of such a device of the character described of simple structure and easy and sufficient operation and which is capable of production at a reasonable cost and thus rendered commercially desirable.

To the accomplishment of these and related objects as may become apparent, the invention resides in the construction, combination and arrangement of parts as shall be hereinafter more fully described, illustrated in the accompanying drawings and pointed out in the claims hereunto appended.

The invention will be best understood and can be more readily described when reference is had to the attached drawings forming a part of this specification, wherein a possible embodiment of one mechanical expression is shown, and in which:

Fig. 1 is a rear elevation of the harrow and

Fig. 2 is a vertical transverse section.

The main sulky frame 3 includes a tongue 4 of usual design and a tongue drawn axle 5. A pair of wheels 6 are mounted on either end of this axle and are adapted to turn freely. The axle 5 being fixed rigid has keyed thereto a plurality of rearwardly and downwardly extending arms 7 whose outer ends 8 are angular to the body part and are normally disposed in a vertical position. An elongated vertical slot 9 is provided in each of these angular ends, being adapted to carry a vertically adjustable horizontal shaft 10 on which are mounted the auger elements 11. The augers 11 of which there are preferably two, are wound in opposite directions so that on the rotation of the shaft 10 the common action of the augers will be to drive the soil toward the centre. They are spaced from each other at their adjacent ends to accommodate a pair of arms 7 spaced a short distance apart. A second pair of the arms 7, whose slotted ends are also laterally offset to support the outer ends of the shaft 10, are placed at opposite ends exterior of the augers.

Pinions 12 are keyed to the extreme ends of this shaft 10. From a lever 13 fulcrumed as at 14 near an end, cables or rods 15 run out to reciprocable but non-rotatable parts of spring urged clutch collars 16 whose outer faces are formed as ratchet wheels to engage co-operating ratchet faces on the inner sides of the wheels 6. On movement of this lever 13 these ratchet faced clutch collars are drawn in against springs from their normal wheel engaging positions and as the clutch collars proper are free to rotate, they are, excepting when disengaged, actuated by the drive wheels. Large driving gear wheels 17 are formed rigidly or even integral with these collars and on them and the shaft carried pinions 12, endless chain belts 18 are mounted.

A second set of arms 19, these provided one on each end just inside the clutch collars, are also keyed to the main axle 5 and extend upwardly and forwardly in alignment with the auger shaft-carrying arms 7. Terminally journalled in these axle carried arms 19 is a tilting bar 20 on which is rigidly mounted an upright lever 21 provided with a spring-urged dog 22 and the usual manually operated release 23. This dog carrying lever works in conjunction with a segmental rack 24, mounted on the main frame 3, through which the bar 20 passes. There extends rearwardly from this tilting bar 20, a trio of radial arms 25 whose outer ends are perforated to accommodate the vertical rods 26 on whose lower end are configurated bearing collars 27 that embrace the shaft 10. One of these rods rises from each end of the shaft between the pinions 12 and the outer shaft carrying arms 7 and the third is disposed centrally, between the central and spaced terminally slotted arms 7. Shaft depressing springs 28 are inserted between the collars 27 and the rod supporting arms 25, encircling said rods so that it will be obvious that as the lever 21 is drawn rearwardly tilting the bar 20 the outer ends of the radial arms 25 compress the springs 28 bearing down on the shaft 10 and urging the augers deeper in to the soil.

The modus operandi of the implement is simple and quite obvious:—As the harrow is moved forwardly by any desired draft means, the drive wheels through the medium of the gears 17 and chains 18 actuate the augers 11 whose vertical adjustment is controlled as heretofore set forth by the co-operating lever and ratchet bar from the drive seat. When it is desired to throw the mechanism out of operation, the transversely hinging lever 13 is used to disengage the clutch mechanism and release the gears from the drive.

From the foregoing description taken in connection with the accompanying drawings, it will be manifest that a harrow is provided which will fulfill all the necessary requirements of such a device, but as many changes could be made in the above description and many apparently widely different embodiments of my invention constructed within the scope of the appended claims without departing from the spirit or scope thereof, it is intended that all matters contained in the said accompanying specification and drawings shall be interpreted as illustrative and not in a limited sense.

What I claim as new and desire to secure by Letters Patent is:—

1. In a harrow, a wheel supported carriage, said carriage comprising a fixed axle on which radially extending frame members are fixedly mounted with downwardly turned rear ends; and a vertically adjustable harrow element carried in said ends of the frame members.

2. In a harrow, a sulky frame having a non-rotatable axle, rearwardly extending radial arms fixed thereto and having downwardly turned rear ends; a vertically adjustable harrow element carried by said ends; and means for operating the harrow element.

3. In a harrow, a sulky frame having a non-rotatable axle, rearwardly extending radial arms fixed thereto and having downwardly turned rear ends, a vertically adjustable harrow element carried by said ends; means for vertically adjusting said harrow element, means for rotating said harrow element; and means for controlling the actuation thereof.

4. In a harrow, a sulky frame having a non-rotatable axle, rearwardly extending radial arms fixed thereto; said arms terminating in depending ends; elongated vertical slots in said depending ends, a rotatable harrow element carried in said slots; vertical rods extending upwardly from said element; springs on said rods; members engaged on said rods and bearing on said springs; and a control lever for said members for holding said element at the bottom of said slots.

5. In a harrow, a sulky frame, radial supporting arms extending rearwardly and downwardly therefrom and having downwardly turned rear ends; a vertically adjustable harrow element carried by said arms, upright posts journalled to said element, forwardly and upwardly extending radial arms aligned with said harrow element; carrying arms, a horizontal bar rotatable therein, a dog-controlled lever adapted to operate the same, radial arms rigid with said shaft whose free ends register with and embrace said posts and post-encircling springs interposed between said auger element and said arms.

6. In a harrow, a wheel carried frame, wheel rotatable drive gear wheels radial supporting arms extending rearwardly and downwardly from said frame and having downwardly turned rear ends, a rotatable harrow element vertically adjustable in said ends and adapted to be rotated by said drive gear wheels; means associated with said drive gear wheels for releasable connection with the gear actuating wheels and lever controlled means for releasing said gear wheels.

In testimony whereof I hereunto affix my signature.

HORACE McGREGOR SPENCER.